United States Patent Office 3,198,234
Patented Aug. 3, 1965

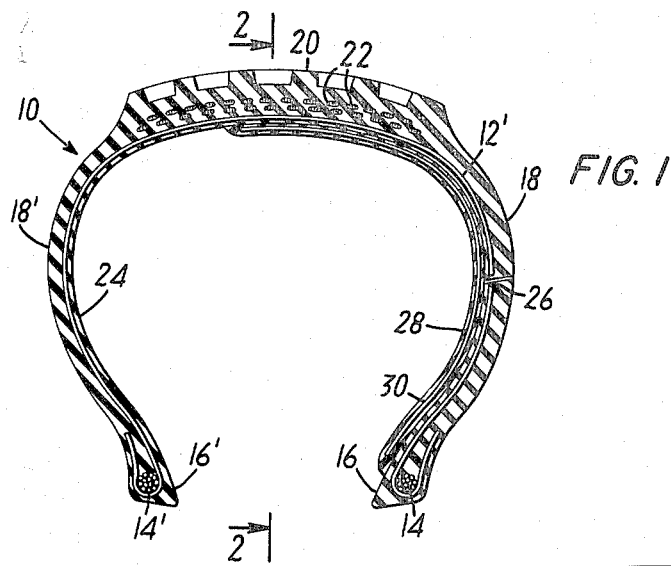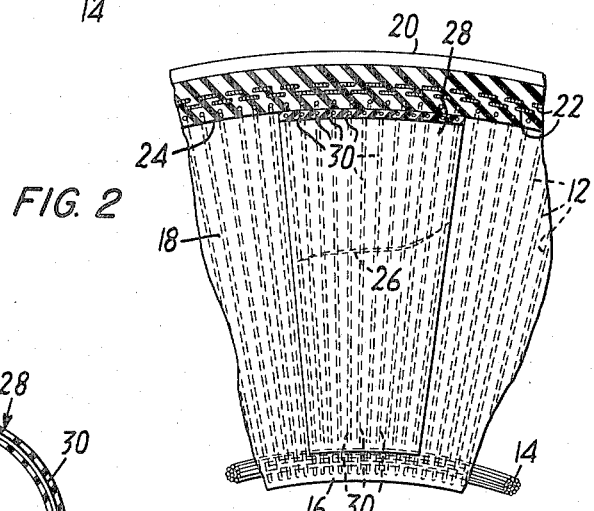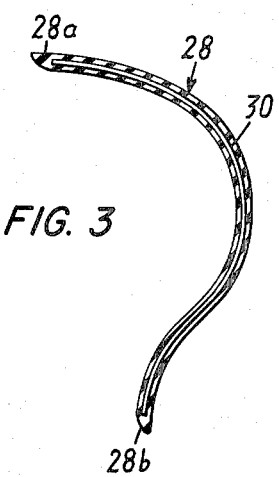
INVENTOR.
JEAN-MARIE MASSOUBRE

3,198,234
METHOD OF REPAIRING PNEUMATIC TIRES
AND PATCHES THEREFOR
Jean-Marie Massoubre, Clermont-Ferrand, France, assignor to Compagnie Generale des Etablissements Michelin, raison sociale Michelin and Cie, Clermont-Ferrand, France
Filed Aug. 30, 1963, Ser. No. 305,746
10 Claims. (Cl. 152—367)

This invention relates to the repair of pneumatic tires and, more particularly, to methods and patches for repairing injuries in the sidewalls of tires of large or very large size and designed for very heavy service.

The presently known types of patches used for the repair of large tires are generally of the same size as or only slightly larger than that of the injury, both in the radial and circumferential directions. They are adhered directly to the inside of the tire or are positioned in a recess formed in the inner surface of the tire.

A significant disadvantage of known types of patches is that they often tear or work loose, particularly along the edges after a relatively short period of service. Additionally, they often cause a rather large protrusion on the outside of the tire in the region where they are applied, which is very much subject to wear and tear and further injury as compared to the undamaged part.

One object of the invention is to provide a novel and improved method of repairing large size injuries in the sidewalls or shoulders of tires of either the tube-containing or tubeless types in which many cords have been broken.

Another object is to provide a patch which is very durable under normal operating conditions, thus considerably extending the usable life of the tire.

A further object is to provide a patch which permits only a minimum of deformation of the repaired tire in the region of the patch and causes only a slight protrusion at the outer surface of the tire adjacent thereto, thus preventing excessive wear in the repaired area.

These and other objects of the invention are accomplished by providing a novel form of patch which is applied to the tire liner over the injury and which extends from the bead to the vicinity of the equatorial plane of the tire and, preferably, has a width not exceeding the width of the injury in order that no cord in the patch duplicates a cord in the tire beyond the injured zone.

It has been found that when the upper and lower edges of the patch are located adjacent the bead and underneath the tread near the equatorial plane, respectively, the patch remains adhered to the liner almost indefinitely, inasmuch as these edges are located in areas of the tire which have been determined to be subject to relatively little deformation as compared to the rest of the tire structure. Unlike conventionally used patches, in which the edges are almost always outside the zone of the tread and/or the bead, and thus lie in regions of the sidewall which are subjected to large deformations and, therefore, to shear stresses at the interface between the patch and the liner, the ends of patches made in accordance with the invention are much less likely to loosen at the edges and lead to complete failure of the repair.

Further, in accordance with the invention, it is preferable that the patch have reinforcing cords, cables or the like embedded therein which are arranged in radial planes, that is, in planes having a common axis when the patch is installed in the tire. The cords may be formed of natural or synthetic fibers, metallic wires, strands or the like. Additionally, the patch is preferably pre-molded and at least partially vulcanized into a shape which conforms substantially to that of the inner surface of the tire to be repaired. The presence of radial reinforcing cords and the preforming of the patch have been found in tests to significantly reduce to a minimum the deformation of the repaired tire and the protrusion on the outside of the tire, as compared to patches cut from a flat sheet and reinforced by parallel cords.

For a better understanding of the invention reference may be made to the following description of an exemplary embodiment, taken in conjunction with the figures of the accompanying drawings, in which:

FIGURE 1 is a view in section taken generally in a radial plane through a tire and illustrating a patch, in accordance with the invention, installed therein;

FIG. 2 is a view in section taken generally through the equatorial plane of the tire, that is, along the line 2—2 of FIG. 1; and FIG. 3 is an edge view in section of the patch alone.

Referring to FIGS. 1 and 2, there is illustrated a typical tire 10 comprising a plurality of cords 12, which may extend radially (as best shown in FIG. 2) or be disposed on a bias between the usual bead reinforcing wires 14 and 14' in beads 16 and 16', sidewalls 18 and 18' and a tread cap 20, below which are tread reinforcing wires or cords 22. Extending entirely around the interior of the outer case 10 and inwardly of the cords 12 is a liner 24.

In the right sidewall 18 of the tire 10, as shown in FIG. 1, is an injury or damaged area 26 in which a number of cords 12' have been accidentally broken. It will be understood that the injury may also include damage to the sidewall 18 and the liner 24 in the area of the ruptured cords 12'.

A patch 28, in accordance with the invention, which is adhered to the liner to repair the injury 26, extends from the bead 16 to the area of the equatorial plane of the tire 10, and is shaped so that its side edges lie radially with respect to the tire, that is, generally parallel to the tire cords 12. The width of the patch 28 in the circumferential direction is preferably not much greater than the width of the injury 26, as shown in FIG. 2.

The patch 28 may be made from any suitable elastomer and consists of a web of the elastomer having a plurality of cords 30 embedded therein. The cords 30 are arranged radially, so that they conform generally to the configuration of the cords 12 of the tire case 10.

The resistance of the tire to bulging or protruding at the repaired area is enhanced when the patch 28 is preformed, such as by molding, and at least partially vulcanized to a shape conforming to that of the liner 24 of the tire 10 between the bead 16 and the equatorial plane. Additionally, the upper and lower edges 28a and 28b, respectively are preferably beveled in order to ensure better adhesion of the patch to the liner 24, particularly at those edges.

In tests conducted to demonstrate the improved performance of the patch, a repair, in accordance with the invention, was made of an injury measuring 360 mm. in width and 520 mm. in height located in the upper zone of the sidewall of a tire of a heavy duty engineering or construction work vehicle. The extent of the deformation of the sidewall, i.e., the height of a protrusion on the outside thereof in the area of the patch, was less than 1 mm. The repaired tire was still in working condition after use for close to 1000 hours under normal operating conditions, that is, under the same conditions as a new tire.

It will be understood by those skilled in the art that the above-described embodiment of the invention is meant to be merely exemplary and is susceptible of considerable variation and modification without departing from the spirit and scope of the invention. Such variations and modifications are intended to be included within the scope of the appended claims.

I claim:
1. A patch for repairing an injury in a pneumatic tire comprising a trapezoidal-shaped sheet of elastomeric material having generally parallel first and second ends disposed at a distance apart so as to be located, respectively, in the region of the bead of the tire and of the equatorial plane of the tire and having opposite edges extending between the ends and diverging from the first end so as to lie in planes meeting at a common axis corresponding substantially to the tire axis, and a plurality of spaced-apart reinforcing cords in the elastomeric sheet diverging from the first end and extending in planes meeting generally at said common axis.

2. A patch according to claim 1 wherein the ends of the cords adjacent the first and second ends, respectively, of the patch are substantially equally spaced apart.

3. A patch for a pneumatic tire, comprising a sheet of elastomeric material having a first portion curving in one direction and a second portion curving in the opposite direction, said curving portions corresponding substantially to the shape in cross-section of the inner wall of the tire between a bead and the area of the equatorial plane thereof, the lateral edges of said patch diverging so as to lie in planes meeting at a common axis, said common axis corresponding substantially to the axis of the tire, and a plurality of spaced-apart reinforcing cords in the elastomeric sheet diverging from adjacent the end of the sheet nearest the common axis and extending in planes meeting generally at said common axis.

4. A patch as claimed in claim 3 having generally parallel circumferential edges arranged to be positioned, respectively, adjacent the bead of the tire and in the area of the equatorial plane of the tire.

5. A repaired pneumatic tire comprising a tire, an injury therein, and a patch overlying said injury made from a thin sheet of elastomeric material and adhered to the inner wall of the tire, said patch having side edges lying generally radially with respect to the tire, having a width in the area of said injury substantially equal to the width of said injury, and having ends lying generally circumferentially with respect to said tire, one end positioned adjacent a bead of the tire and the other end positioned in the area of the equatorial plane of the tire.

6. A repaired pneumatic tire as claimed in claim 5 wherein said patch includes a plurality of spaced-apart reinforcing cords embedded in the sheet of elastomeric material and lying in generally radial planes with respect to the tire.

7. A repaired pneumatic tire, comprising a tire having spaced-apart radial carcass reinforcing cords, an injury in the sidewall of said tire, a patch made from a sheet of elastomeric material adhered to the inner wall of the tire, and a plurality of spaced-apart reinforcing cords embedded in said patch and disposed generally parallel to the carcass reinforcing cords of the tire, said patch having generally parallel circumferential ends positioned, respectively, adjacent a bead of the tire and in the area of the equatorial plane of the tire, and the lateral edges of said patch disposed generally in radial planes of the tire.

8. A repaired pneumatic tire as claimed in claim 7 wherein said patch has a width in the area of said injury substantially equal to the width of said injury.

9. A repaired pneumatic tire as claimed in claim 7, wherein said cords in said patch overlie exclusively said carcass reinforcing cords.

10. A repaired pneumatic tire as claimed in claim 7, wherein said patch includes only cords overlying exclusively the cords of said tire transecting said injury.

References Cited by the Examiner

UNITED STATES PATENTS

| | | | |
|---|---|---|---|
| 1,016,349 | 2/12 | McKee | 152—372 |
| 1,666,002 | 4/28 | Cole | 152—367 |
| 2,057,798 | 10/36 | Springer | 152—367 |
| 2,344,677 | 3/44 | Cornell | 152—367 |

FOREIGN PATENTS 648,929    8/28    France.

ARTHUR L. LA POINT, *Primary Examiner.*

PHILIP ARNOLD, *Examiner.*